United States Patent [19]
Karube

[11] Patent Number: 4,910,749
[45] Date of Patent: Mar. 20, 1990

[54] LASER OSCILLATOR DEVICE
[75] Inventor: Norio Karube, Machida, Japan
[73] Assignee: Fanuc Ltd., Minamitsuru, Japan
[21] Appl. No.: 305,870
[22] PCT Filed: May 24, 1988
[86] PCT No.: PCT/JP88/00493
§ 371 Date: Jan. 27, 1989
§ 102(e) Date: Jan. 27, 1989
[87] PCT Pub. No.: WO88/09577
PCT Pub. Date: Dec. 1, 1988
[30] Foreign Application Priority Data
May 28, 1987 [JP] Japan ................................. 62-132803
[51] Int. Cl.$^4$ .......................... H01S 3/097; H01S 3/22; H01S 3/03
[52] U.S. Cl. ......................................... 372/87; 372/55; 372/61
[58] Field of Search ............................. 372/87, 61, 55

[56] References Cited
U.S. PATENT DOCUMENTS
3,427,567 2/1969 Bridges et al. .................... 372/87
4,370,598 1/1983 Krahn .................................. 372/87

Primary Examiner—William L. Sikes
Assistant Examiner—Georgia Y. Epps
Attorney, Agent, or Firm—Staas & Halsey

[57] ABSTRACT

A laser oscillator device produces an electric discharge between confronting double helical electrodes for laser pumping. The electrodes (9b, 9b) are helically wound an integral number of turns, and start being helically wound at points which are $\pi/n$ spaced about the axis of the discharge tube segments (1). This arrangement achieves a more completely circular mode and a fundamental mode.

3 Claims, 3 Drawing Sheets

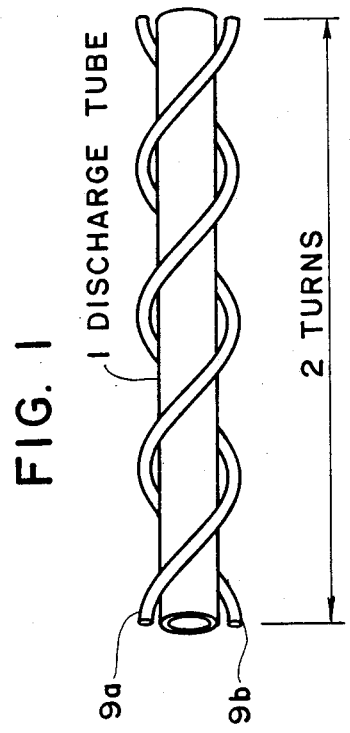
FIG. 1
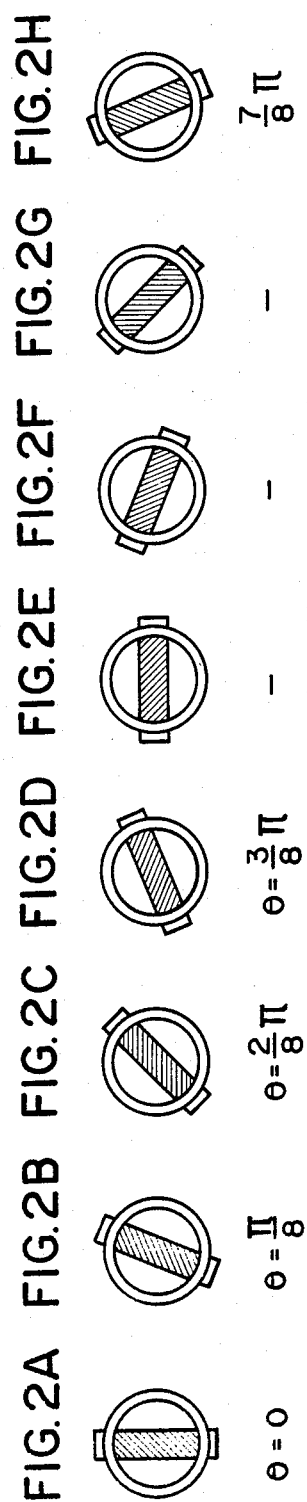

FIG. 4
(PRIOR ART)
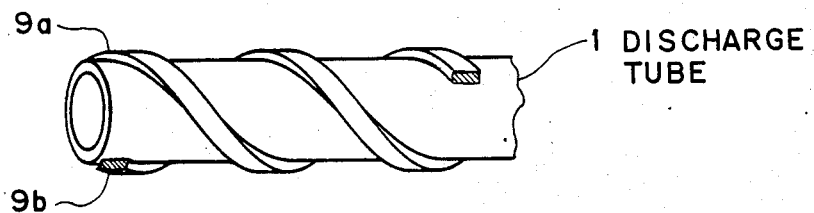
FIG. 5
(PRIOR ART)
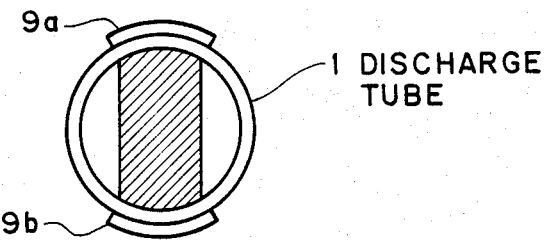
FIG. 6
(PRIOR ART)
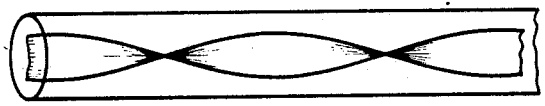
FIG. 7A
FIG. 7B
(PRIOR ART)
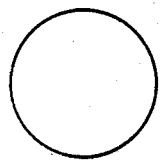
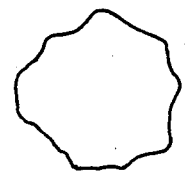

LASER OSCILLATOR DEVICE

TECHNICAL FIELD

The present invention relates to a laser oscillator device for producing a high-power laser beam for cutting workpieces of metal or the like, and more particularly to an improvement in the transverse mode of a laser oscillator device capable of high-frequency pumping.

BACKGROUND ART

High-frequency discharge pumped axial-flow $CO_2$ lasers are in the process of being developed because of their advantages of high-power output and stable oscillation. One example of such a laser is disclosed in Japanese Patent Application No. 61-243212 filed by the applicant.

A conventional axial-flow-type high-frequency discharge pumped laser oscillator device is illustrated in FIG. 3 of the accompanying drawings. The illustrated laser oscillator device includes a discharge tube 1 comprising four tube segments connected in series. However, the discharge tube 1 may have a desired number of tube segments dependent on the output to be produced. A total reflection mirror 2 and an output coupling mirror 3 are accurately positioned at the ends of the discharge tube 1. Denoted at 4 s an outgoing laser beam. The segments of the discharge tube 1 have gas inlet and outlet ports connected to a single roots blower 8. Cooling units 6, 7 serve to cool a laser gas heated by the discharge and the compression in the roots blower 8. The laser gas flows in the discharge tube 1 and gas delivery tubes in the directions of the arrows. Electrodes 9a, 9b~12a, 12b are connected to a high-frequency power supply 5. The gas flows in the discharge tube 1 at the speed of about 100 m/second. An electric discharge is produced in the discharge tube 1 by a high-frequency voltage applied by the high-frequency power supply 5 to generate laser oscillation.

FIG. 4 shows the structure of each discharge tube segment. The electrodes 9a, 9b are jointly of a double helical construction. The electric discharge is produced between the electrodes as indicated by the hatched area in the cross section of each discharge tube segment shown in FIG. 5. Tee plane of the electric discharge is twisted as shown in FIG. 6. This is to obtain a circular mode by successively twisting the non-circular cross sections of the discharges in the respective tube segments and averaging the successively twisted discharge cross sections.

Actual laser oscillator devices, however, fail to obtain a completely circular mode as shown in FIG. 7(a). As illustrated in FIG. 7(b), an actual mode is caused to deviate from a completely circular mode because the discharge gain in each discharge tube segment has a distribution in the direction of the gas flow.

DISCLOSURE OF THE INVENTION

It is an object of the present invention to provide a laser oscillator device which will solve the aforesaid problems and which includes a high-frequency pumping axial-flow $CO_2$ laser with its transverse mode improved into a circular mode.

According to a first invention, there is provided a laser oscillator device for producing an electric discharge between confronting double helical electrodes for laser pumping, said electrodes having an integral number of helical turns.

According to a second invention, there is provided a laser oscillator device for producing an electric discharge between confronting double helical electrodes for laser pumping, comprising:

a laser resonator composed of n discharge tube segments connected in series; and said discharge tube segments having electrodes which start being helically wound at points that are $\pi/n$ spaced around the axis of the discharge tube segments.

According to a third invention, there is provided a laser oscillator device for producing an electric discharge between confronting double helical electrodes for laser pumping, said electrodes having an integral number of helical turns, said laser oscillator device comprising:

a laser resonator composed of n discharge tube segments connected in series; and said discharge tube segments having electrodes which start being helically wound at points that are $\pi/n$ spaced around the axis of the discharge tube segments According to a fourth invention, there is provided a laser oscillator device for producing an electric discharge between confronting double helical electrodes for laser pumping, comprising:

a laser resonator composed of n discharge tube segments connected in series;

said discharge tube segments including discharge tube segments in which a laser gas flows in the same direction as the direction of a laser beam and discharge tube segments in which a laser gas flows in the opposite direction to the direction of a laser beam;

said discharge tube segments being grouped according to the direction of the laser gas, said discharge tube segments in each group having electrodes which start being helically wound at points that are $2\pi/n$ spaced around the axis of the discharge tube segments.

With the first invention, the number of helical turns of the electrodes on each discharge tube segment is an integer, making the laser mode closer to a circular mode. A circular mode is sought in each discharge tube segment.

With the second invention, the points at which the electrodes start being helically wound are $\pi/n$ spaced successively on the respective discharge tube segments, so that the directions of the electrodes around the axis of the discharge tube segments are uniformly distributed over all the discharge tube segments.

With the third invention, the discharge tube segments in the first invention are coupled, and the points at which the electrodes start being helically wound are $\pi/n$ spaced successively on the respective discharge tube segments as with the second invention. That is, the first and second inventions are combined to achieve a more completely circular mode.

With the fourth invention, since the laser gas flows in different directions in some of the discharge tube segments and the gain distribution is not uniform in the directions of the laser gas flow, the discharge tube segments are divided into two groups according to the direction of the laser gas low, and a uniform gain distribution is achieved in each laser gas flow direction.

BRIEF DESCRIPTION OF THE DRAWINGS

FIG. 1 is a view showing the helical structures of electrodes;

FIGS. 2A–2H are a set of views illustrating the distribution of electrode orientations at the start point of the electrode;

FIG. 4 is a view of double helical electrodes;

FIG. 5 is a view showing the manner in which an electric discharge is produced in the cross section of a discharge tube;

FIG. 6 is view showing the concept of a twisted electric discharge produced by the double helical electrodes;

FIG. 7(a) is a diagram showing a transverse mode of a circular symmetry; and

FIG. 7(b) is a diagram illustrating a transverse mode deviating from a circular symmetry.

BEST MODE FOR CARRYING OUT THE INVENTION

Figure 3:
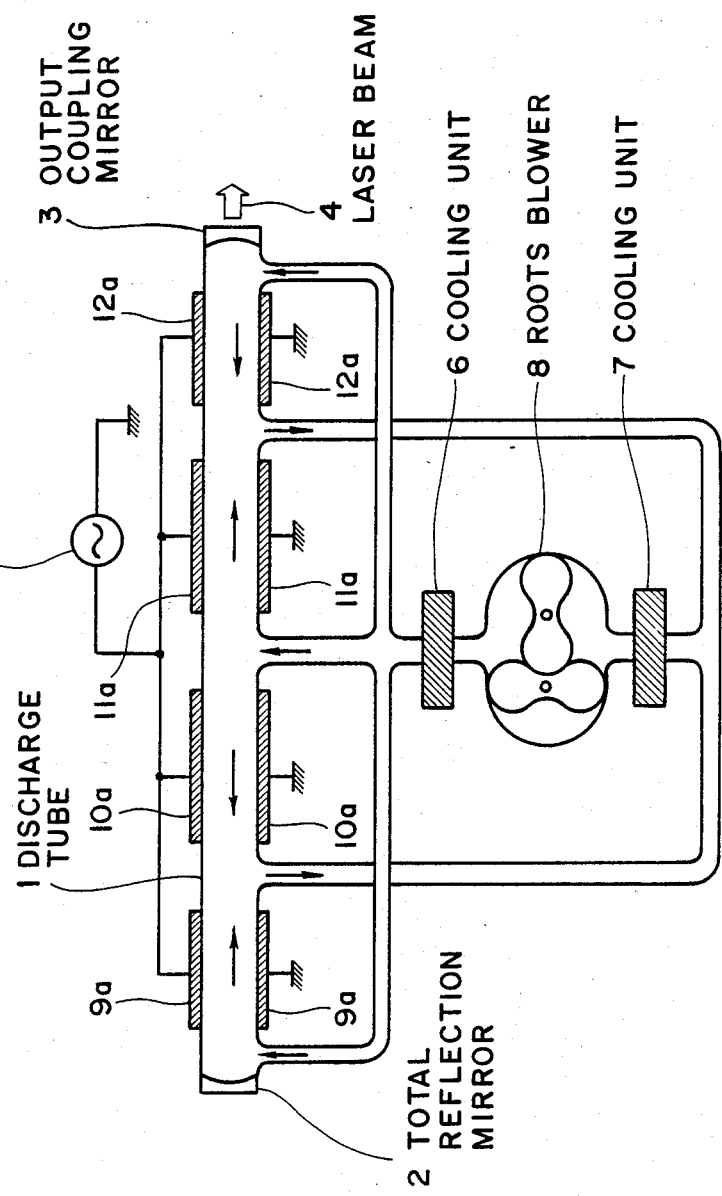
FIG. 3 is a view showing the structure of a conventional laser oscillator device.

Embodiments of the present invention will hereinafter be described in specific detail with reference to the drawings.

FIG. 1 shows the helical structures of electrodes on a discharge tube segment. Denoted at 1 is a discharge segment and electrodes 9a, 9b of a double helical In FIG. 1, the electrodes are shown as being three-dimensional so as to clearly indicate the phases of the helical structures of the electrodes, particularly, the points where the electrodes start and stop being helically wound. In the illustrated example, the number of turns of each electrode is 2. If the number of turns is an integer, the laser mode is close to a circular mode. For example, experimental comparison between the electrodes of 1.8 turns and the electrodes of 2 turns shows that the electrodes of 1.8 turns produce a laser mode which deviates from a circular mode.

FIG. 2 illustrates the distribution of electrode orientations at the start point of the electrode. In FIG. 2, the number of discharge tube segments used is 8, and the difference between adjacent orientations is $\pi/8$. The orientation angle $\theta$ of the electrodes on the first discharge tube segment is $\theta = 0$. The electrodes on the next discharge tube start being helically wound from a point with the orientation $\theta = \pi/8$, and the electrodes on the third discharge tube start being helically wound from a point with $2\pi/8$. The orientations of following helically winding points are successively different by $\pi/8$.

Where there are n discharge tube segments, then the difference between the orientations of the discharge tube segments is $\pi/n$. With this arrangement, the directions of the electrodes around the axis of the discharge tube segments are uniformly distributed over all the discharge tube segments.

If the discharge tube segments with the number of electrode turns being 2 as shown in FIG. 1 are arranged as shown in FIG. 2, the laser mode becomes closer to a circular mode.

In the aforesaid description, no consideration is given to the direction of flow of a laser gas in each of the discharge tube segments. If there are two directions in which the laser gas can flow, then since it suffices for a uniform gain distribution to be established with respect to each of the directions, the number of discharge tube segments in each of the directions becomes:

$$n/2$$

Then, the orientations of the electrodes on the discharge tube segments in each direction may be uniformly different, as shown in FIG. 2, by:

$$\pi/(n/2) = 2\pi/n$$

Even if the laser gas flows in different directions, however, an approximate approach may be taken in which the orientations are not determined dependent on the direction of the laser gas. Such an approach may be selected dependent on the extent of a circular mode to be sought.

Even when the number of turns of the electrodes on each of the discharge tube segments is not an integer in the above embodiments, a sufficiently circular mode can be obtained simply by varying the orientations of points where the electrodes on the discharge tube segments start being turned or helically wound.

According to the present invention, as described above, in order to achieve a uniform gain distribution, the number of turns of electrodes on each discharge tube segment is selected to be an integer, or the points at which electrodes on respective discharge tube segments start being helically turned or wound are made different by a constant orientation, or these helical winding points are made different by a constant phase in each of the directions of flow of a laser gas. With these arrangements, a more completely circular mode is achieved, making it easy to obtain a $TEM_{oo}$ mode which is a fundamental mode. As a result, laser beam focusing characteristics are improved and so are laser beam machining characteristics.

I claim:

1. A laser oscillator device, comprising:
   a discharge tube composed of n discharge tube segments connected in series;
   a total reflection mirror and an output coupling mirror installed in respective ends of said discharge tube;
   means for supplying a laser gas to each of said discharge tube segments, to generate a gas flow in said discharge tube segments;
   double helical electrodes installed around each of said discharge tube segments, and facing each other across said discharge tube, said double helical electrodes for each segment being helically wound an integral number of turns, the starting points of said double helical electrodes for each of said segments being $\pi/n$ rotated about an axis of said discharge tube with respect to each preceding segment from said total reflection mirror to said output coupling mirror; and
   a high-frequency power supply for supplying a high-frequency electronic power to said double helical electrodes.

2. A laser oscillator device, comprising:
   a discharge tube composed of n discharge tube segments connected in series;
   a total reflection mirror and an output coupling mirror installed in respective ends of said discharge tube;
   means for supplying a laser gas to each of said discharge tube segments, to generate a gas flow in said discharge tube segments;

double helical electrodes installed around each of said discharge tube segments, and facing each other across said discharge tube, said double helical electrodes for each segment being helically wound an integral number of turns, the starting points of said double helical electrodes of n discharge tube segments having the same direction of said gas flow being $\pi/n$ rotated about the axis of said discharge tube with respect to each other from said total reflection mirror to said output coupling mirror; and a high-frequency power supply for supplying a high-frequency electronic power to said double helical electrodes.

3. The laser oscillator device of claim 2, wherein said discharge tube segments including discharge tube segments in which a laser gas flows in the same direction as the direction of a laser beam and discharge tube segments in which a laser gas flows in the opposite direction to the direction of a laser beam.

* * * * *

UNITED STATES PATENT AND TRADEMARK OFFICE
CERTIFICATE OF CORRECTION

PATENT NO. : 4,910,749
DATED : March 20, 1990
INVENTOR(S) : NORIO KARUBE

It is certified that error appears in the above-identified patent and that said Letters Patent is hereby corrected as shown below:

Column 1, line 29, "4 s" should be --4 is--.

Column 2, line 25, "segments" should be --segments.--.

Column 3, line 24, "herein" should be --herein- --;

line 27, "helical" should be --helical construction.--.

Signed and Sealed this

Seventh Day of May, 1991

Attest:

HARRY F. MANBECK. JR.

*Attesting Officer*    *Commissioner of Patents and Trademarks*